United States Patent
Ho (10) Patent No.: US 8,548,865 B1
(45) Date of Patent: Oct. 1, 2013

(54) SYSTEM AND METHOD FOR GROUP GIFT EXCHANGES

(75) Inventor: Kevin Y. Ho, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 79 days.

(21) Appl. No.: 13/074,345

(22) Filed: Mar. 29, 2011

(51) Int. Cl.
  *G06Q 30/00* (2012.01)
(52) U.S. Cl.
  USPC .......................................... 705/26.1
(58) Field of Classification Search
  USPC .......................................... 705/26.1
  See application file for complete search history.

(56) References Cited

U.S. PATENT DOCUMENTS

| 8,239,275 B1 * | 8/2012 | Lyren et al. | 705/26.1 |
| 2005/0108182 A1 * | 5/2005 | Roberts | 706/46 |
| 2008/0228597 A1 * | 9/2008 | Sondles | 705/27 |

* cited by examiner

*Primary Examiner* — Mila Airapetian
(74) *Attorney, Agent, or Firm* — McCormick, Paulding & Huber LLP (57) ABSTRACT

Systems and methods for organizing and conducting group gift exchanges among two or more participants generally enable multiple participants to order an item and to receive an item in return. Items may be allocated on a random basis, or on some other basis, such as the cost or other characteristic of the respective items, or the known preferences or interests of the respective participants. The systems and methods may take the form of free-standing applications or may be incorporated into existing merchant web sites or social networks, and may include components or processes for receiving orders of items and for allocating items among each of the participants.

22 Claims, 5 Drawing Sheets

|     | $G_1$     | $G_2$     | $G_3$     | $G_4$     |
|-----|-----------|-----------|-----------|-----------|
| $P_1$ | $C_1$-$C_1$ | $C_1$-$C_2$ | $C_1$-$C_3$ | $C_1$-$C_4$ |
| $P_2$ | $C_2$-$C_1$ | $C_2$-$C_2$ | $C_2$-$C_3$ | $C_2$-$C_4$ |
| $P_3$ | $C_3$-$C_1$ | $C_3$-$C_2$ | $C_3$-$C_3$ | $C_3$-$C_4$ |
| $P_4$ | $C_4$-$C_1$ | $C_4$-$C_2$ | $C_4$-$C_3$ | $C_4$-$C_4$ |

FIG. 6A

|           | tie | shoes | hat | shirt |
|-----------|-----|-------|-----|-------|
| John      |     | 5     | 2   | 3     |
| Mary      | 5   |       | 3   | 2     |
| Patrick   | 2   | 3     |     | 1     |
| Elizabeth | 3   | 2     | 1   |       |

SYSTEM AND METHOD FOR GROUP GIFT EXCHANGES

BACKGROUND OF THE INVENTION

Gift exchanges are common social activities that currently take place around a holiday season or in connection with certain events. Gift exchanges may be simple or complex in nature, and typically occur among a designated group of people, each of whom buys a gift for another person in the group and also receives a gift in return. For example, in a gift exchange among members of a family, each family member may be assigned to purchase a gift for another family member, such as by drawing names out of a hat, and may also receive a gift from another family member in return. Some more complex gift exchanges include a "Secret Santa," in which each participant purchases a gift for a randomly assigned recipient but the recipient is not told the identity of the participant who purchased the gift, or a "Yankee Swap," in which each member of a group purchases a single gift, and the members of the group choose between opening an unopened gift or taking an opened gift away from another, unwitting member of the group.

In addition to holiday situations, gift exchanges may be organized and conducted for any reason. For example, a group containing members who share a common interest, such as fans of a particular movie or sports team, may wish to hold a gift exchange in which participants buy and receive gifts pertaining to the commonality among them. Additionally, gift exchanges may be centered around a theme, such as a particular holiday or annual event.

Gift exchanges can increase the levels of fun and excitement that are normally associated with conventional gift-giving situations. While gift exchanges are enjoyable, however, existing systems and methods for conducting gift exchanges typically have severe limitations, in that they usually require each of the participants to be located within the same premises in order to give or receive their gifts. Alternatively, participants who are separated by great distances generally must communicate with the other participants by telephone or E-mail, and each of the participants must make arrangements to deliver their gifts. Furthermore, the scope of individuals who may participate in a gift exchange is presently limited to known members of groups, for example, members of a family or fan club, or residents in an apartment building.

DETAILED DESCRIPTION

As is set forth in greater detail below, the present disclosure is directed to systems and methods for organizing and conducting group gift exchanges among groups of participants, in which two or more participants each purchase a gift for another participant, and ultimately receive a gift from another participant in return. Specifically, the present disclosure describes systems and methods that permit multiple participants to each contribute a single gift to a group gift exchange, and to receive a single gift from the group gift exchange in return. Such systems and methods are particularly useful when they are incorporated into Internet-based electronic commerce systems, such as a merchant web site, or utilized in connection with a social network, wherein the participants may include users of the merchant web site or members of the social network.

The systems and methods of the present invention may be utilized by a group of two or more people, such as family, to exchange gifts among one another in connection with a holiday or other occasion. For example, if John, Mary, Patrick and Elizabeth wish to participate in a group gift exchange at Christmastime, each of them may visit a merchant web site that operates an embodiment of the present invention to sign up for the group gift exchange and to order one gift. The systems and methods described herein may then allocate one gift to each of the participants who contributed a gift to the group gift exchange. If John, Mary, Patrick and Elizabeth plan to spend the holidays together in one location, then the merchant web site can arrange to deliver each of the gifts to that location, so that John, Mary, Patrick and Elizabeth can receive their respective gifts together there. If John, Mary, Patrick and Elizabeth are unable to celebrate the holidays together, then the merchant web site can deliver the gifts to each of the recipients at a predetermined location, such as their respective homes. The costs associated with shipping each of the gifts may be allocated to either the purchaser or the recipient of the gift, or aggregated and allocated among each of the participants in equal parts.

The systems and methods of the present invention may be used to organize and conduct group gift exchanges for any reason, such as a holiday celebration in which gifts are normally exchanged, including Christmas, Hanukkah or Kwanzaa, or holidays or other events when gifts are not typically exchanged, such as Presidents Day or the first day of fall. Moreover, the systems and methods of the present invention may be used to organize gift exchanges in which participants have the freedom to independently contribute gifts of any kind or type, but may also be based on a central theme. For example, a group gift exchange that is held in March may be based on an Irish theme, because St. Patrick's Day falls in that month, or a sports theme, based on the college basketball championships that are typically held in that month. In the month of July, a gift exchange may be based on summertime or Independence Day themes. Gifts that are purchased by and distributed to participants may relate to the particular theme associated with the group gift exchange, such as Irish knitted wools, a basketball jersey, barbecue sauces or an American flag.

According to one embodiment of the present invention, group gift exchanges may also be organized among members of a defined group, and based on a commonality shared by the members of the group. For example, if a group gift exchange is to be organized and conducted among members of a fan club of a specific sports team, then the gifts may be selected from a set of items pertaining to the sports team. Where a gift exchange is conducted among fans of the Boston Red Sox, for example, the exchanged gifts may include baseball cards featuring members of the Red Sox, artifacts or memorabilia relating to Red Sox history, or tickets to a Red Sox game.

According to another embodiment of the present invention, participation in group gift exchanges need not be limited to members of a defined group, as the sets of participants in the group gift exchange may be open-ended, i.e., opened to the public or to an unlimited set of participants. Potential participants may be invited to participate in the group gift exchange, for example, by electronic means. For example, a merchant web site may advertise a group gift exchange among potential customers, who may receive word of the group gift exchange via electronic mail, by visiting the merchant web site, or by any other means. A member of a social network, particularly a member who has a significant number of connections on the social network, such as a celebrity, may extend an open invitation to fans, friends and other connections to participate in a group gift exchange. A celebrity may further incentivize participation in the group gift exchange if he or she also participates, thereby creating the opportunity for any given participant to receive a gift from the celebrity. Additionally, a merchant may offer discounts on gifts relating to the celebrity that are purchased by contributors. Group gift exchanges that are organized in such a manner may include hundreds or even thousands of participants, many of whom do not know each other.

Additionally, the systems and methods of the present invention may include interfaces having displays for enhancing the experiences of those who are participating in group gift exchanges, such as interactive maps displaying the respective locations of individual participants across the country or around the world. The displays may also provide random facts regarding the gifts that have been purchased by participants, for example, to identify popular items or features of items (such as colors, prices or other characteristics of items), and may further suggest recommended items based on known characteristics of the individual participants.

The systems and methods may provide for the distribution of gifts among participants in a group gift exchange on any basis. For example, gifts that are purchased in connection with the group gift exchange may be exchanged among participants on a completely random basis. Gifts may also be exchanged based on their cost, wherein a participant receives a gift that is nearly equal to, or is equal to, the cost of the gift that the participant contributed to the group gift exchange. Gifts may further be exchanged among participants based on the characteristics of the gifts themselves, which may be compared to the known preferences and interests, purchasing histories or membership profiles of the respective participants. Where the group gift exchange is to be held in connection with a merchant web site, for example, gifts may be distributed to members of the web site based on their known transaction history and/or personal information, which may be maintained in a customer profile maintained on the merchant web site or on related computers or servers.

Furthermore, the distribution of gifts to participants may be augmented with additional items, packaging or other features provided by one or more participants in the group gift exchange, or an organizer of the group gift exchange. For example, a father participating in a group gift exchange may wish to augment the gifts distributed to his children by including a special, additional gift, such as a picture frame or memento, and may wrap the gifts in packaging or wrapping paper that may be meaningful to them. Where a celebrity participates in or otherwise endorses a group gift exchange, the celebrity may include an additional gift or wrapping with each participant's gift. For example, if a musician or movie star participates in a gift exchange, each participant may receive a copy of the musician's latest compact disc with his or her gift, or the gifts may be wrapped with paper including pictures or advertisements associated with the movie star's latest film.

A group gift exchange may be subject to any other number or type of limitations or restrictions as desired by an organizer of the group gift exchange or the participants in the group gift exchange, including limitations or restrictions on the participants or the gifts that may be purchased in connection with the group gift exchange. For example, eligible gifts may include those having a maximum price or a minimum price, or those having a price within a specified range. Additionally, the participation in a group gift exchange may be bounded by a maximum number of participants or a minimum number of participants, as is desired by the organizer of the group gift exchange. Although a group gift exchange may be organized and conducted among as few as two participants, those of skill in the art will recognize that a minimum of three participants may be preferred, if it is desired to conceal the identities of gift purchases from gift recipients. Furthermore, an organizer may limit participation in the group gift exchange to individuals who are located in a particular region, which may reduce shipping costs, or to individuals having a certain affiliation, such as those who are members of a group or Facebook® "friends" with a particular individual.

Furthermore, the systems and methods of the present invention may be used to organize and conduct group gift exchanges that embody traits or characteristics of common gift exchanges, such as a "Secret Santa" or a "Yankee Swap." For example, the identity of a purchaser of a gift may be concealed from the recipient of the gift, or revealed only after each gift has been allocated and distributed to each recipient. Additionally, gifts may be interactively allocated among participants in the group gift exchange, wherein each participant may purchase a single gift without knowing the identity of the participant who will receive it. The participants may then alternately choose between opening an unopened gift or selecting an opened gift, such as in a chat room or other online format, and the gifts may be ultimately delivered after they have been allocated among the participants. If desired, the type of group gift exchange may be identified on interfaces or displays associated with the systems and methods of the present invention, or on the gifts or packaging associated with the gifts. For example, the gifts or associated packaging may indicate whether the gift is intended for a particular occasion, or to be opened on a particular date.

Moreover, an online merchant or vendor may initiate a gift exchange in order to increase traffic to its web site or the amount of sales generated therefrom and may, for example, offer reduced prices in an effort to incentivize the participation in a group gift exchange. The merchant or vendor may then create an online forum on a web site, such as a chat room, an electronic mail list or LISTSERV, or a social network group, in which participants may convene to discuss aspects of the group gift exchange as well as popular gifts that may be purchased by participants. After the group gift exchange has been held, participants may return to the forum to discuss their participation in the exchange, and may provide comments on or reviews of the gifts that were received. In addition to sales data regarding the gifts that were purchased for the group gift exchange, such pre-exchange and post-exchange discussions may provide a merchant or vendor with valuable sales and marketing information regarding current trends and hot items.

Therefore, in accordance with one embodiment of the present invention, two or more participants may participate in a group gift exchange, in which everyone who participates in the group gift exchange not only purchases a gift but also receives a gift in return, i.e., wherein X gifts are purchased by and allocated among X participants. The participants may include a finite number of members of a defined group, such as a family, or any number of individuals who need not be affiliated with a group, such as customers visiting a merchant web site or members of a social network. The gifts distributed in connection with a group gift exchange may also be augmented by additional items provided by one or more participants or an organizer of the group gift exchange. Participation in the group gift exchange may be defined or limited for any reason, such as based on the geographic location or affiliation of the participants, and gifts may be allocated among participants in the group gift exchange on any basis, such as randomly. The systems and methods of the present invention thus provide efficient and simple means for organizing and conducting a group gift exchange, including means for designating participants, means for receiving orders or purchases of gifts and means for allocating gifts among the participants.

Figure 1:
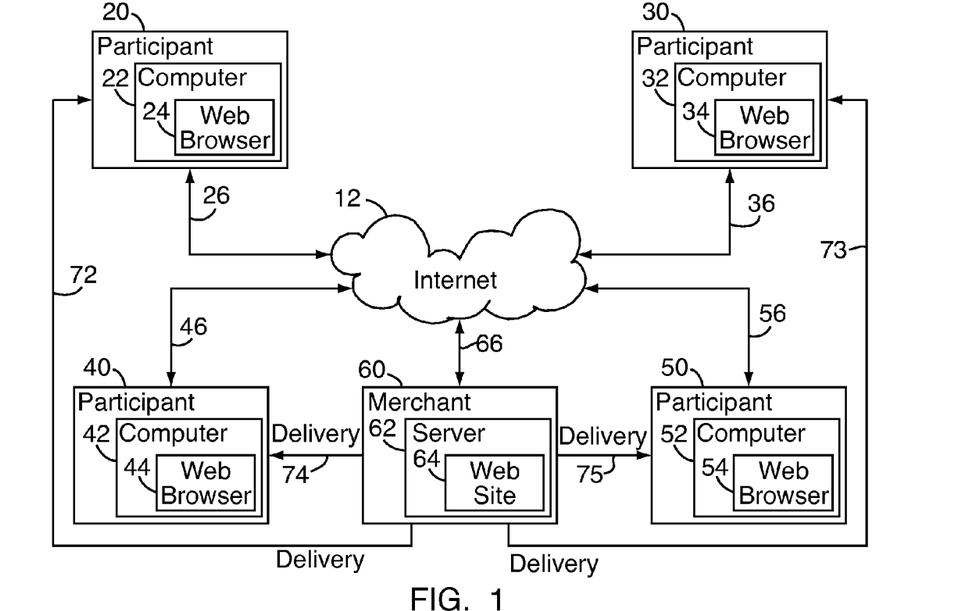
FIG. 1 is a block diagram of the components of a customer-merchant shopping system, in accordance with embodiments of the present disclosure.

Referring to FIG. 1, the various components of an embodiment of an interactive system 10 that may be used in accordance with the present disclosure are shown. The system 10 provides for interactions between multiple participants 20, 30, 40, 50 and a merchant 60. Each of the participants 20, 30, 40, 50 may be an entity or individual that wishes to purchase, rent, lease, borrow, or otherwise obtain items (e.g., goods, products, services, information or media of any type or form) from the merchant 60 using a client application, such as web browsers 22, 32, 42, 52 running on computers 24, 34, 44, 54.

The merchant 60 may be any entity that sells or otherwise makes items available for purchase, rent, lease or borrowing by customers, such as participants 20, 30, 40, 50, through a merchant web site 64 which is implemented using one or more computers or servers 62. The participants' computers 22, 32, 42, 52 are connected to or otherwise communicate with the merchant 70 through the external network 12, such as the Internet, as indicated by lines 26, 36, 46, 56, by the sending and receiving of data over the network 12. The contributors 20, 30, 40, 50 use the web browsers 24, 34, 44, 54 to display user interfaces for viewing and/or communicating with the merchant web site 72. In addition, the merchant 60 may obtain or make available one or more items that are manufactured by or obtained from one or more third party vendors (not shown), and may also be a vendor that manufactures or otherwise has access to items for purchase, rent, lease or borrowing.

Also, those of skill in the pertinent art will recognize that participants 20, 30, 40, 50 may use a keyboard, keypad, mouse, stylist, touch screen, or other device (not shown) or method for interacting with the computers 22, 32, 42, 52 and/or web browser 24, 34, 44, 54, or to "select" an item, link, node, hub or any other aspect of the present disclosure. The computers, servers, and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the term "merchant" also refers to the associated computer systems operated or controlled by a merchant. Thus, process steps described as being performed by the "merchant" may be automated steps performed by their respective computer systems. These steps are implemented within software modules (or computer programs) executed by one or more general purpose computers. For example, the web browsers (or user interfaces) 24, 34, 44, 54 may be implemented on computers 22, 32, 42, 52 and the web sites 64 may be maintained on servers 62 using one or more hardware components or software applications. Specially designed hardware could alternatively be used to perform certain operations. Process steps described as being performed by a "participant", "purchaser", or "recipient" are typically performed by a human operator via a computer 20, 30, 40, 50, but could, alternatively, be performed by an automated agent.

The participants 20, 30, 40, 50 may use any web-enabled or Internet applications, such as the web browsers 24, 34, 44, 54 or any other client-server applications or features including electronic mail or other messaging techniques to communicate with (or connect to) the merchant server 62 and/or web site 64, through the external network 12. In addition, the computers 22, 32, 42, 52 may be any of a number of computing devices that are capable of communicating over the network, including but not limited to set-top boxes, personal digital assistants, mobile phones including "smart" phones, digital media players, web pads, tablets, laptop computers, desktop computers, electronic book readers, and the like. The protocols and components for providing communication between the computers 22, 32, 42, 52 and the merchant server 62 and/or web site 64 are well known to those skilled in the art of computer communications. As such, they need not be described in more detail herein.

The data and/or computer executable instructions, programs, firmware, software and the like (also referred to herein as "computer executable components") described herein may be stored on a computer-readable medium that is within or accessible by the computers 22, 32, 42, 52 or the server 62, having sequences of instructions which, when executed by a processor (such as a central processing unit, or CPU), cause the processor to perform all or a portion of the functions and/or methods described herein. Such computer executable instructions, programs, software and the like may be loaded into the memory of the computers 22, 32, 42, 52 or the servers 62, using drive mechanisms associated with the computer readable medium, such as a floppy drive, CD-ROM drive, DVD-ROM drive, network interface, or the like, or via external connections.

For purposes of illustration, the systems and methods described herein will be referenced primarily in the context of a system that includes a merchant-operated web site for making items available for purchase, rent, lease or borrowing, such as that which is shown in FIG. 1. As will be recognized by those of skill in the art, however, the systems and methods disclosed herein may also be used in numerous other environments.

Figure 2:
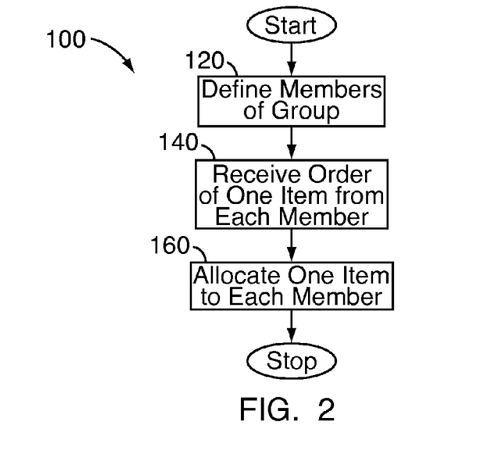
FIG. 2 is a flow chart of a method for exchanging gifts in accordance with an embodiment of the present disclosure.

Referring to FIG. 2, a flow chart 100 illustrates one embodiment of an algorithm or a process for conducting a group gift exchange among a set of participants, in which each of the participants purchases and ultimately receives a gift. At step 120, the constitution or membership of the group is defined, such as to include the number of participants who have signed up or registered at the merchant web site. At step 140, one item is ordered by each of the participants, such as by purchasing a gift from the merchant web site and designating the gift for inclusion in the group gift exchange. At step 160, each of the items is allocated to one member of the group. Accordingly, according to the embodiment of the present invention represented by the flow chart 100 in FIG. 1, where X members of a group participate in the group gift exchange, X items are distributed among the X members, and each member who purchased one item receives one item from another member in the group.

Figure 3A:
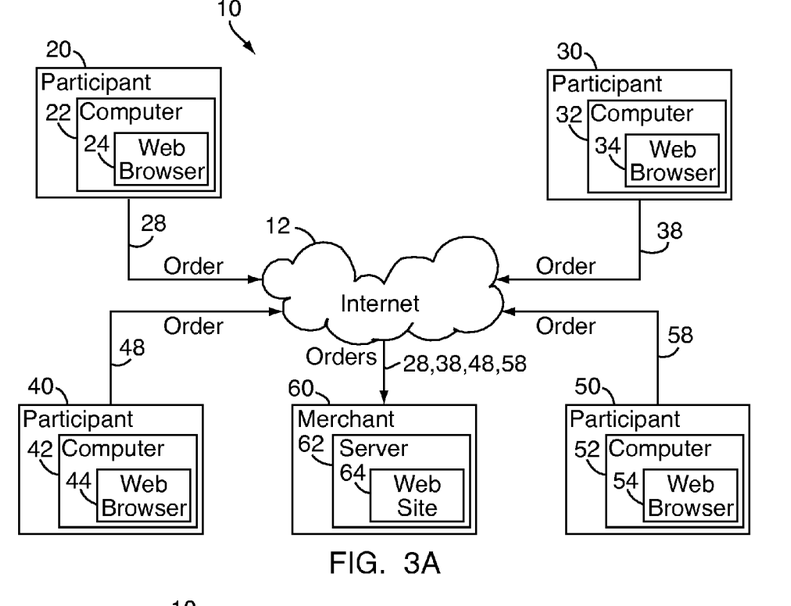
FIGS. 3A and 3B are block diagrams of a customer-merchant shopping system, in accordance with embodiments of the present disclosure.
Figure 3B:
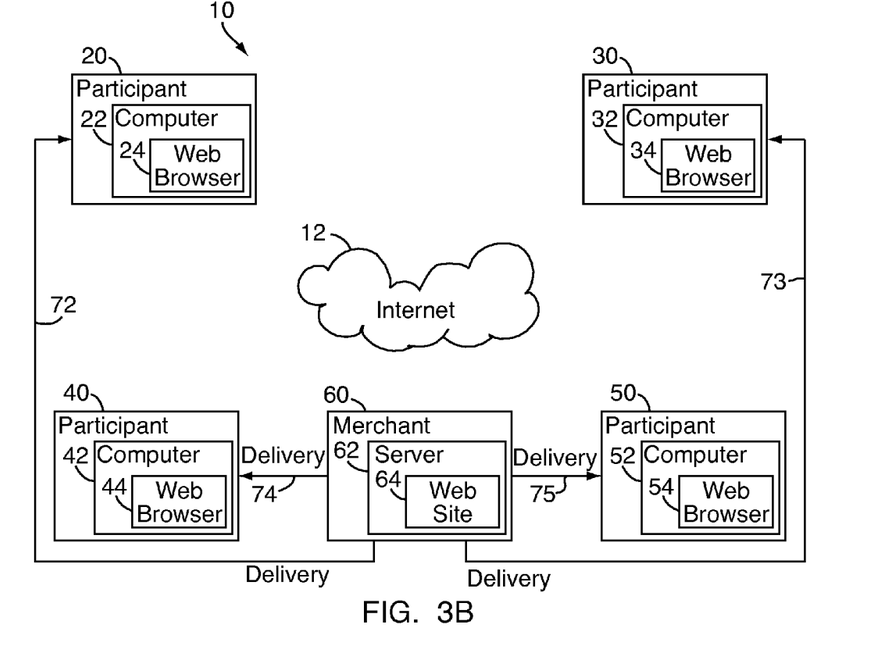

Referring to FIGS. 3A and 3B, participants 20, 30, 40, 50 may visit a merchant web site 64 and place orders 28, 38, 48, 58 for items with the merchant 60. The merchant 60 may then allocate the orders 28, 38, 48, 58 among the participants 20, 30, 40, 50, and make deliveries 72, 73, 74, 75 to participants 20, 30, 40, 50. Preferably, a participant in a group gift exchange does not receive the same item that he or she ordered. Where the participation in a group gift exchange is sufficiently large, or where a particular item is sufficiently popular, however, it is possible that a participant may receive an item that is the same as, or similar to, the item that he or she purchased from the merchant web site and contributed to the group gift exchange.

In operation, the process represented by the flow chart 100 in FIG. 2 may be utilized with the system 10 shown in FIG. 1 to effectuate the group gift exchange represented in FIG. 3A and FIG. 3B as follows. For example, participants 20, 30, 40, 50, such as John, Mary, Patrick and Elizabeth, may visit a merchant web site 64 and elect to participate in a group gift exchange. John, Mary, Patrick and Elizabeth may place orders 28, 38, 48, 58 for individual items that are available for sale at the merchant web site 64. The merchant 60 may then allocate the ordered items to John, Mary, Patrick and Elizabeth, on any basis such as randomly. Additionally, the costs associated with delivering the items may be assigned to the participant who purchases or receives the individual items, or combined and assigned to each of the participants in equal parts.

Figure 4:
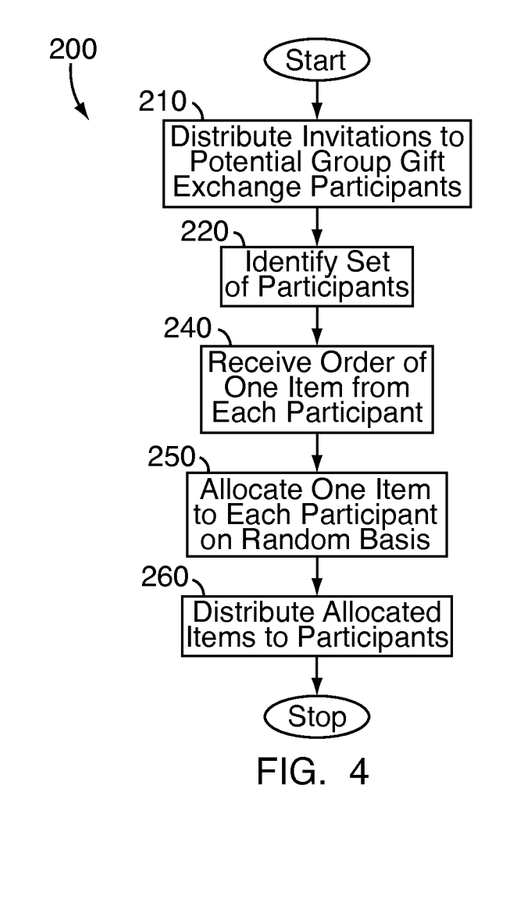
FIG. 4 is a flow chart of a method for exchanging gifts in accordance with an embodiment of the present disclosure.

According to the systems and methods of the present invention, items may be allocated among participants in the group gift exchange for any reason, or based on any criteria. For example, items may be allocated on a random basis. Referring to FIG. 4, a flow chart 200 illustrates one embodiment of an algorithm or a process for conducting a group gift exchange among a group of participants, in which each participant is invited to partake in the group gift exchange and to purchase a gift, where each participant receives a gift that has been randomly assigned to him or her. The process begins at step 210, where a number of invitations are distributed to potential participants, such as by any form of electronic messaging (e.g., electronic mail, instant messaging, secondary message applications within a social network, or short message service (SMS) or multimedia message service (MMS) text messages). The invitation may include or refer to any means for accepting the information, such as a link, group password or other identifying code representing the particular group gift exchange. At step 220, the constitution or membership of the participants in the group gift exchange is defined, and at step 240, an item is ordered by each of the participants. At step 250, each of the items is allocated to one of the participants on a random basis, and at step 260, each of the items is delivered to the respective participant to whom it has been allocated.

Items may be randomly allocated to participants, such as is set forth in step 250 of FIG. 4, by any known means for randomly assigning each of a set of X items to one of a set of X participants. For example, the systems and methods of the present invention may include or otherwise incorporate therein a random number generator, along with any necessary circuitry, logic or code, in order to randomize the allocation of each particular item to one particular participant. If a number or other identifier is assigned to each of the participants and/or to each of the items, a random number generator may therefore allocate one item to each participant on a completely random basis, or to allocate items to participants on a weighted basis. Alternatively, an organizer or administrator of the group gift exchange may modify a list of gifts or a distribution thereof for any reason. For example, the organizer may intervene where a particular item has been allocated to a particular participant, and may reassign another, more suitable item to the participant. Additionally, a participant who contributes a particular gift to a group gift exchange may recommend or specify another participant for whom the particular gift is most appropriate.

The systems and methods of the present invention may notify a recipient of the gift that has been allocated to him or her in connection with a group gift exchange before the gift is delivered, thereby giving the recipient the opportunity to substitute the gift for another more desirable item or a gift certificate or other form of credit. For example, if a participant purchases a particular item in connection with the group gift exchange, and the same or a similar item is assigned to that participant, the participant may be alerted by an electronic mail or other form of message from a merchant that he or she is about to receive the same or a similar item, which may offer him or her the opportunity to replace the item with another item or receive a credit which may be applied to a future purchase from the merchant.

The systems and methods of the present invention may also allocate items to participants in the group gift exchange based on the respective costs of each of the items. For example, after each of the participants has been identified and has purchased an item, the systems and methods may construct a table or array containing information regarding the individual participant, the item that he or she purchased, and the cost of that particular item. The systems and methods may then utilize the information contained in the array to further allocate the items among the participants in such a manner that each participant receives an item having a cost that is most nearly equal to the cost of the item that the participant purchased. In such a manner, the systems and methods may prevent, or minimize the risk of the inequity that may result when a participant purchases an item having one value and receives an item having a significantly different value.

Figure 5:
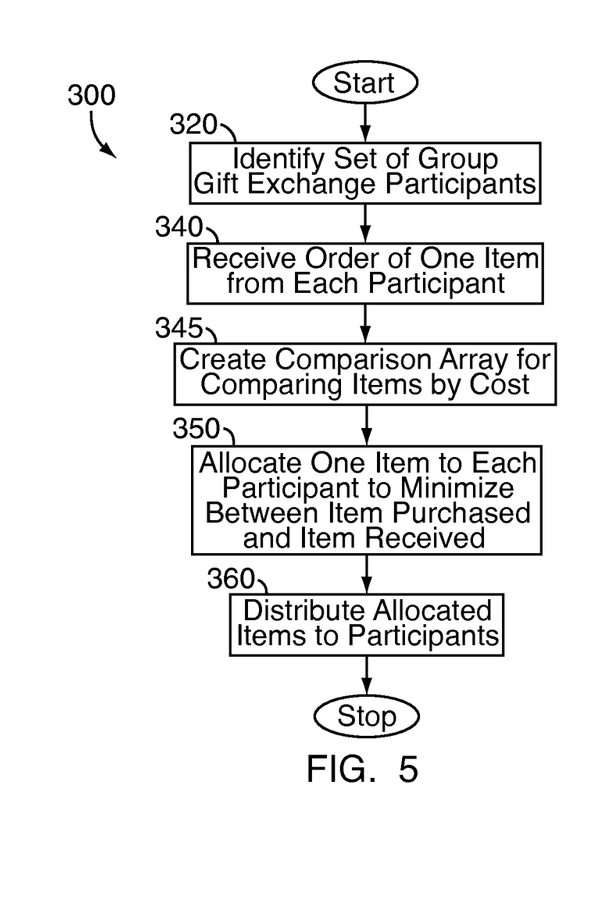
FIG. 5 is a flow chart of a method for exchanging gifts in accordance with an embodiment of the present disclosure.

Referring to FIG. 5, a flow chart 300 illustrates one embodiment of an algorithm or a process for conducting a group gift exchange among a set of participants, in which each of the participants purchases and ultimately receives a gift. At step 320, the set of group gift exchange participants is identified. At step 340, an order of one item is received from each of the participants, and at step 345, a comparison array is created for comparing the various items based on their respective costs. At step 350, each item is allocated to a participant, in such a manner that minimizes the difference between the cost of the item that the participant contributed and the cost of the item that the participant received. At step 360, each of the items is distributed to the respective participants.

For example, where a group gift exchange is organized and held among n participants, a comparison array, such as that which is referred to in step 345 of FIG. 5 above, may contain information regarding each participant $P_i$, and the gift $G_i$ purchased by the participant $P_i$, including the cost $C_i$ of the gift $G_i$. Accordingly, for each of the n participants, a set of variables $(P_i, G_i, C_i)$ exists, and the absolute values of the difference in the cost $C_i$ of the gift $G_i$ may be compared to each of the costs $C_i, C_j, C_k \ldots C_n$ of each of the gifts $G_i, G_j, G_k \ldots G_n$ purchased by each of the participants $P_i, P_j, P_k \ldots P_n$. For example, if John, Mary, Patrick and Elizabeth are participating in a group gift exchange, and if John purchased a tie which costs $5, Mary purchased a pair of shoes which costs $10, Patrick purchased a hat which costs $7 and Elizabeth purchased a shirt which costs $8, the set of variables ($P_i$, $G_i$, $C_i$) would include (John, tie, $5), (Mary, shoes, $10), (Patrick, hat, $7) and (Elizabeth, shirt, $8).

Figure 6A:
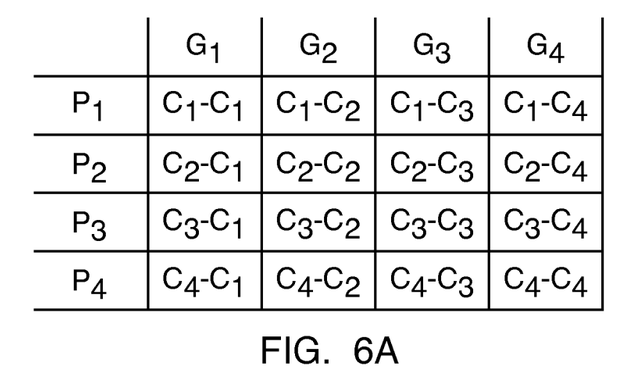
FIGS. 6A and 6B are diagrams illustrating tables for making data available for access and use by an embodiment of the present disclosure.
Figure 6B:
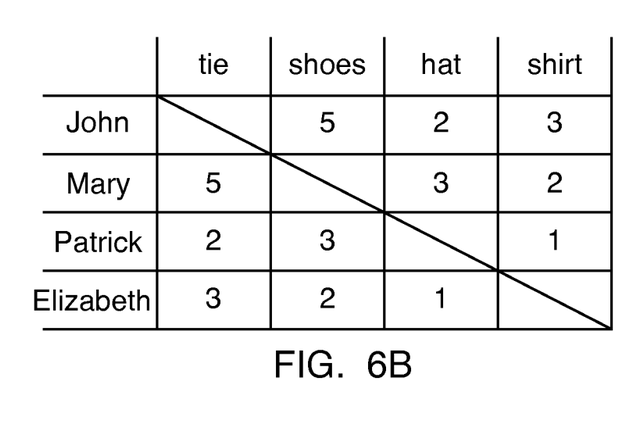

Referring to FIG. 6A, a table having rows associated with participants $P_1$, $P_2$, $P_3$ and $P_4$, and columns associated with gifts $G_1$, $G_2$, $G_3$ and $G_4$, is shown. Each cell ($P_i$, $G_j$) in the table indicates the absolute value of the difference between the cost $C_i$ of the gift $G_i$ purchased by participant $P_i$, and the cost of the gift purchased by participant $P_j$, or $|(C_i-C_j)|$. In the foregoing example, in which John, Mary, Patrick and Elizabeth are participants in a group gift exchange, the table shown in FIG. 6A would be populated as is shown in FIG. 6B. For example, the absolute difference between the cost $C_3$ of the hat $G_3$ purchased by Patrick $P_3$ and the cost $C_2$ of the shoes $G_2$, purchased by Mary $P_2$ or $|(C_3-C_2)|$, is $|(\$7-\$10)|$, or $3.

Once a comparison array, such as the array shown in FIG. 6B, has been generated for a set of participants and a set of items, the systems and methods of the present invention may then determine the most efficient allocation of each of the items to each of the participants based on the respective prices of the items, that the cost or value of the item received by a participant is as close as possible to the cost or value of the item that the participant contributed to the group gift exchange. For example, referring to FIG. 6B, the most efficient manner in which the gifts contributed by John, Mary, Patrick and Elizabeth could be allocated among them, such that no participant received the gift that he or she contributed, would be to distribute the hat $G_3$ that was purchased by Patrick for $7 to John; the shirt $G_4$ that was purchased by Elizabeth for $8 to Mary; the tie $G_1$ that was purchased by John for $5 to Patrick, and the shoes $G_2$ that were purchased by Mary for $10 to Elizabeth.

Although the comparison arrays are referenced in the context of the costs of items, those of skill in the art will recognize that the systems and methods disclosed herein may also be used to allocate items based on comparisons of any other aspect thereof. For example, items may be allocated among participants based on a comparison of their sizes, shapes, masses, dimensions, colors or any other characteristic or feature, such that each participant receives a gift that most closely relates to the gift that he or she contributed to the group gift exchange.

The systems and methods of the present invention may also allocate items among participants in a group gift exchange based on the known interests, habits, or preferences of the respective participants. This format is particularly valuable where the systems and methods of the present invention are incorporated into a merchant web site, which may store or otherwise possess personal information and/or a purchasing history in a member profile or other set of information.

Figure 7:
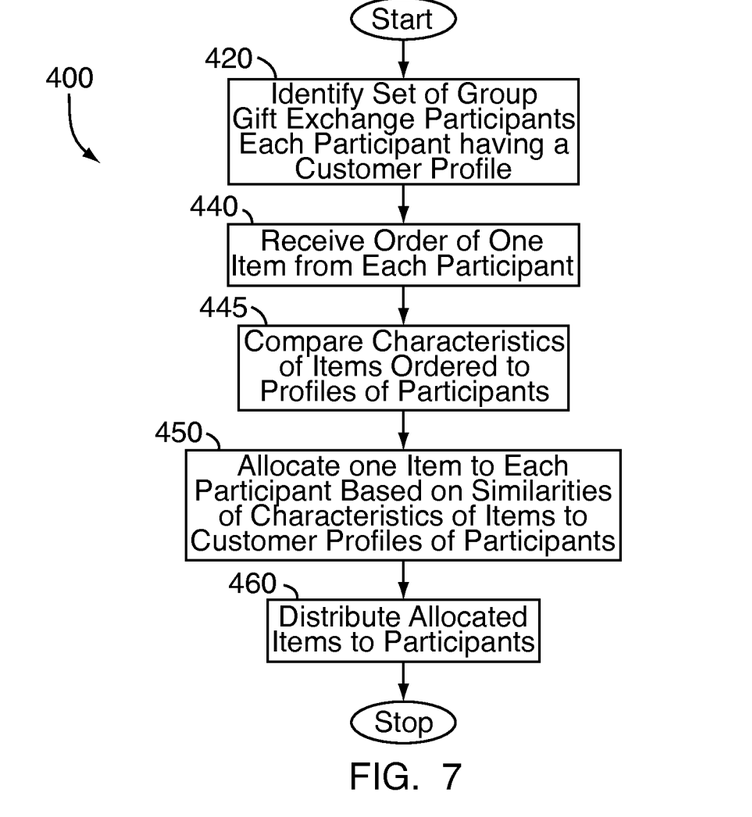
FIG. 7 is a flow chart of a method for exchanging gifts in accordance with an embodiment of the present disclosure.

Referring to FIG. 7, a flow chart 400 illustrates one embodiment of an algorithm or a process for conducting a group gift exchange among a set of participants, in which each of the participants purchases a gift from a merchant web site, and wherein the gifts are ultimately allocated and distributed to respective participants based on information contained in a customer profile maintained by the merchant. At step 420, the set of group gift exchange participants, each of whom has a customer profile, is identified. At step 440, an order for one item is received from each of the participants. At step 445, the merchant web site compares the characteristics of each of the items ordered by each of the participants to the information contained in participants' customer profiles, and at step 450, each item is allocated to a participant based on similarities between at least one aspect of the item and at least some of the information contained in the customer profiles. At step 460, each of the allocated items is distributed to the respective participants.

By associating the items purchased by the participants in a group gift exchange with known information regarding each of the participants, such as that which may be contained in a customer profile, the systems and methods of the present invention may increase the likelihood that each of the participants in a group gift exchange will be ultimately satisfied with the gift that he or she receives. For example, the Southport Wine Club may include four members named Kathleen, Jennifer, Julia and Edna, each of whom is interested in participating in a group gift exchange of wine-related gifts using a web site operated by a merchant or a vendor. Kathleen, Jennifer, Julia and Edna may then each visit the merchant web site to register for the group gift exchange and to order their wine-related gifts. Kathleen orders a plate of fresh cheeses; Jennifer orders a set of expensive wine glasses; Julia orders a bottle of Pinot Noir; and Edna orders a bottle of Port.

Previously, Kathleen, Jennifer, Julia and Edna have visited the merchant web site to establish customer profiles and purchase items there. Their customer profiles and purchasing histories indicate, for example, that Kathleen has listed her home address as New York, that Jennifer has purchased items in preparation for a trip to South Africa that she intends to take in the near future; that Julia has recently read consumer reviews on a popular cookbook that includes recipes for American comfort foods; and that Edna recently ordered a gift for her mother-in-law who lives in Seattle.

Therefore, if an embodiment of the present invention were to allocate the items purchased by each of the participants based on known, available information regarding their personal interests and purchasing histories, the plate of fresh cheeses that was purchased by Kathleen may be delivered to Julia, because Julia has expressed an interest in American comfort foods. The set of wine glasses that was purchased by Jennifer may be delivered to Kathleen, because the set of wine glasses is popular among customers who are from New York, where she lives. The bottle of Pinot Noir that was purchased by Julia may be delivered to Edna, because Pinot Noir is a popular wine produced by vineyards in the Pacific Northwest, and the bottle of Port purchased by Edna may be delivered to Jennifer because Port is a popular wine produced by vineyards in South Africa.

Accordingly, the systems and methods of the present invention may be used to organize a group gift exchange where each of the participants shares a common interest, and where each of the items is allocated based on individual interests held by each of the participants.

Furthermore, known information regarding each of the participants, such as that which may be maintained in a customer profile maintained at a merchant web site, may be used to improve the suitability of a particular item for a particular participant. For example, where a participant orders an item of a particular size, such as a shirt that is a size large, and the item is determined to be particularly appropriate for a participant who normally wears a size medium, the systems and methods of the present invention may substitute a size medium shirt for the size large shirt before the shirt is ever delivered to the participant. In such a manner, the systems and methods may enhance the experiences of both the participant who ordered the shirt and the participant who receives it, by eliminating the need to exchange the shirt in order to obtain a correct size.

Those of skill in the art recognize that the embodiments of the present invention described above to incorporate a number of features that would enhance the functionality of the systems and methods disclosed herein.

Although the disclosure has been described herein using exemplary techniques, components, and/or processes for implementing the systems and methods of the present invention, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer-readable medium having a computer-executable component embodied therein, wherein said computer-executable component is adapted to implement a method for conducting a group gift exchange, the method comprising:
   distributing an invitation to each of a first plurality of individuals over a network;
   receiving an order to purchase an item in connection with the group gift exchange from each of a second plurality of participants;
   identifying an item characteristic for each of the ordered items;
   identifying a participant characteristic for each of the participants;
   allocating each of the ordered items to one of the participants based on a relationship between the item characteristic of the ordered item and the participant characteristic of the one of the participants according to an algorithm executed by at least one processor operating on at least one computer; and
   distributing each of the ordered items to the participant to which the ordered item has been allocated.

2. The computer-readable medium of claim 1, wherein the method further comprises:
   establishing an array comprising a third plurality of cells, wherein each of the cells contains data corresponding to the relationship between the item characteristic for each of the ordered items and the participant characteristic for each of the participants,
   wherein the algorithm allocates at least one of the ordered items to one of the participants based on at least some of the data contained in the array.

3. A computer-implemented method for exchanging items among a group including a plurality of participants, comprising:
   receiving an order of one item to be applied to a group gift exchange from each of the plurality of participants over a network;
   identifying an item characteristic for each of the ordered items;
   identifying a participant characteristic for each of the participants; and
   allocating each of the ordered items to one of the participants according to an algorithm executed by at least one processor operating on at least one computer,
   wherein the algorithm allocates each of the ordered items to one of the participants based on a relationship between the item characteristic for the ordered item and the participant characteristic for the one of the participants.

4. The computer-implemented method of claim 3, further comprising distributing each of the ordered items to the one of the participants to which the ordered item has been allocated.

5. The computer-implemented method of claim 4, wherein distributing each of the ordered items comprises delivering each of the items to a common location.

6. The computer-implemented method of claim 3, wherein the item characteristic is a cost associated with each of the ordered items.

7. The computer-implemented method of claim 3, wherein the participant characteristic is a cost associated with the ordered item that was ordered by each of the participants.

8. The computer-implemented method of claim 3, wherein the participant characteristic is based on at least one of a purchasing history, a personal preference or a location for each of the participants.

9. The computer-implemented method of claim 8, wherein the at least one of the purchasing history, the personal preference or the location is stored in a customer profile for each of the participants.

10. The computer-implemented method of claim 3, wherein each of the participants is a member of a group.

11. The computer-implemented method of claim 3, wherein each of the ordered items relates to a common theme.

12. The computer-implemented method of claim 3, further comprising of distributing an invitation to participate in the group gift exchange to a plurality of individuals.

13. The computer-implemented method of claim 12, wherein the invitation comprises a link to a web page adapted to receive an order for an item.

14. The computer-implemented method of claim 12, wherein the invitation is distributed by an electronic message selected from the group consisting of electronic mail, an SMS text message, an MMS text message and a message delivered over a social network.

15. A computer system having a computer that executes a program adapted to cause the computer system to perform a method comprising:
   receiving an order for an item from each of a first plurality of participants;
   establishing an array having a second plurality of cells arranged in a first plurality of rows and a first plurality of columns;
   populating each of the cells with data corresponding to a relationship between a participant and an item;

allocating each of the items to one of the participants based on the data.

16. The computer system according to claim 15, wherein the relationship is a difference between a cost of the item ordered by the participant and a cost of the item ordered by another participant.

17. The computer system according to claim 16, wherein each of the items is allocated to one of the participants in order to minimize a sum of the differences.

18. The computer system of claim 15, wherein each of the rows corresponds to one of the participants and each of the columns corresponds to one of the items, and wherein each of the cells contains data regarding the relationship between the one of the participants and the one of the items.

19. The computer system of claim 15, wherein each of the rows corresponds to one of the items and each of the columns corresponds to one of the participants, and wherein each of the cells contains data regarding the relationship between the one of the items and the one of the participants.

20. A computer system for performing a group gift exchange comprising:
    a database for storing a plurality of customer profiles; and
    a server configured to:
        receive an order for an item from each of a plurality of participants; and
        allocate each of the items to one of the participants according to the customer profiles,
    wherein each of the participants has an associated customer profile stored in the database.

21. The computer system according to claim 20, wherein each of the customer profiles includes at least one of a purchasing history, a personal preference and a location pertaining to one of the participants.

22. The computer system according to claim 20, wherein the server is further configured to transmit code for displaying a web page including at least one of information regarding at least one of the items or information regarding at least one of the participants.

* * * * *